US008555779B2

(12) United States Patent
Berger

(10) Patent No.: US 8,555,779 B2
(45) Date of Patent: Oct. 15, 2013

(54) DEVICE FOR TREATING A FRUIT

(76) Inventor: Sebastian Berger, Buenos Aires (AR)

( * ) Notice: Subject to any disclaimer, the term of this patent is extended or adjusted under 35 U.S.C. 154(b) by 842 days.

(21) Appl. No.: 12/253,502

(22) Filed: Oct. 17, 2008

(65) Prior Publication Data

US 2009/0211461 A1    Aug. 27, 2009

(30) Foreign Application Priority Data

Oct. 17, 2007  (AR) .................. M20070104593 U

(51) Int. Cl.
*A47J 25/00*  (2006.01)
(52) U.S. Cl.
USPC ............................................... 99/538
(58) Field of Classification Search
USPC .................................. 99/494, 538
See application file for complete search history.

(56) References Cited

U.S. PATENT DOCUMENTS 2,751,864 A  *  6/1956  Parker ..................... 30/113.3
6,860,197 B2 *  3/2005  Gable ........................ 99/538

FOREIGN PATENT DOCUMENTS

EP           1183973  A1  *  3/2002

* cited by examiner

*Primary Examiner* — Gene Kim
*Assistant Examiner* — Amir Klayman
(74) *Attorney, Agent, or Firm* — Porzio, Bromberg & Newman, P.C.

(57)  ABSTRACT

A device drills longitudinally a fruit, such as a banana, for its subsequent filling. The device includes a header with a projecting cylindrical part. The header is vertically perforated by a cylindrical upper part and a lower cylindrical or conical part, and from the internal face of such header and from diametrically opposite areas respective arms in parallel extend in longitudinal laterally opposite edges arched sections defining such perforation a connection for a tubular member with a spindle-shaped edge and an inner wing. The inner wing is fixed to a perforated part and arched so as to form a handle, having each arm part of the device in their lower ends surfaces arched outwards that define a component in which are fitted and supported a pair of arched diametrically opposite grooves in a cylindrical part forming the base and concentric to a central cylindrical cavity.

4 Claims, 7 Drawing Sheets

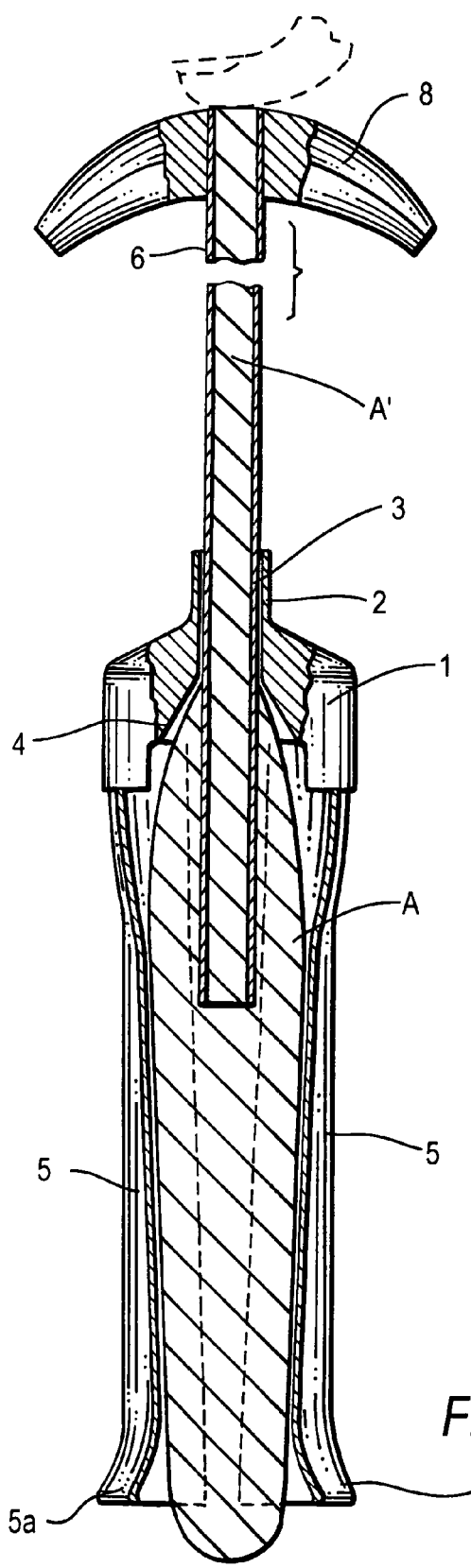
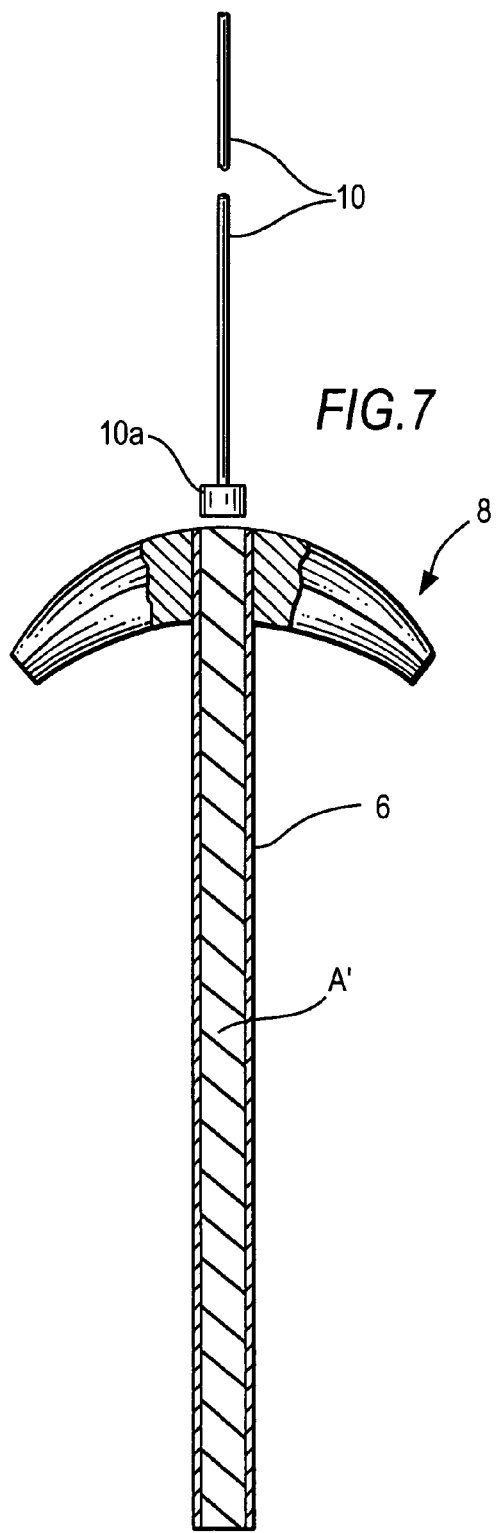
FIG. 6
FIG. 7

DEVICE FOR TREATING A FRUIT

BACKGROUND OF THE INVENTION

1. Field of the Invention

This invention relates to a device for treating a fruit, such as a banana, for its subsequent filling.

2. Description of the Related Art

Concerning the edible part and more specifically relating to a fruit such as the banana, it is usual for the consumer to mix it with a food product such as chocolate, cream, toffee caramel, honey, etc. before eating it, which entails peeling the fruit, cutting it or not, and/or mashing it, which are steps that must be done using cutlery and a dish or a similar object.

Another way of eating a banana is by covering it, after it is peeled, with chocolate. These cases are not very frequent since, although they add different flavors to the product, some special devices or apparatus similar to those used to cover ice cream with chocolate must be used.

BRIEF SUMMARY OF THE INVENTION

It is the main object of the present invention to form a longitudinally extending cavity within, for example, a banana by means of a device with specific characteristics.

Another object is to position the banana within the device without previously peeling it and by introducing a tubular member, drill it and then remove the remainder banana pulp without affecting its external shape.

A further object is to remove the tubular member and by means of obstruction in the upper opening and together with a little notch in an internal wall of a tubular member of the device, and adjacent to the lower end, the remainder in a compact way to permit, once this operation is complete, to inject into such cavity a food product.

To obtain a device to form a longitudinally extending cavity within a banana that includes two identical parallel arms separated by about 2.5 cm. in its rear side and about 4 cm. in its front side, which adopts a certain curvature in the shape of a flexible tube that can be widened and adjusted according to the pressure put when the banana is manually positioned within the device, allowing its straightening by pressing with the finger.

The upper section of such device forming the supporting head of the parallel components presents internally a cylindrical/conical annular ribbed cavity that permits centralizing in a safe and fast way the banana base end. Since the abovementioned parallel components are curved this allows sliding in and insertion of the fruit without damaging it, the tubular member that is introduced into the fruit once it is straightened has in its lower section a cut or notch in the shape of a hook or small flag that once it is introduced, it rotates and inserts the cylindrical internal pulp of the fruit and removes it totally without having to eject the air.

BRIEF DESCRIPTION OF THE SEVERAL VIEWS OF THE DRAWINGS

FIG. 4-6 are respective views of cross-sectional views in three operational positions of the drilling of a banana.

FIG. 7 is a cross-sectional view of the tubular member to which a rod is inserted in order to allow the removal of the remainder pulp of the banana for its subsequent use.

DETAILED DESCRIPTION OF THE INVENTION

As shown in FIGS. 1-8, the present invention is a device for the longitudinal perforation of a fruit for its subsequent filling. The fruit may be a banana or any other known fruit, as well as any other known food. The device includes a header, a plurality of arms, a rod, and an extractor. The header has an upper surface, a lower surface, a cylindrical header cavity, and a cylindrical projecting member projecting from the upper surface of the header, with the cylindrical projecting member having an upper cylindrical opening, and a central cylindrical cavity contiguous with the cylindrical header cavity.

The plurality of arms extend from the lower surface of the header and from diametrically opposite areas in parallel in longitudinal laterally opposite edges arched sections for retaining the fruit adjacent to the lower surface of the header. The extractor has a tubular member for insertion into the retained fruit through the upper cylindrical opening and through the central cylindrical cavity, and for removal of an inner portion of the retained fruit; and a handle having an upper surface with an extractor upper opening for receiving the rod, whereby after the extractor retains and extracts the inner portion of the retained fruit as the extractor is removed from the upper cylindrical opening, insertion of the rod into the extractor upper opening pushes out the inner portion of the retained fruit form the extractor.

Figure 1:
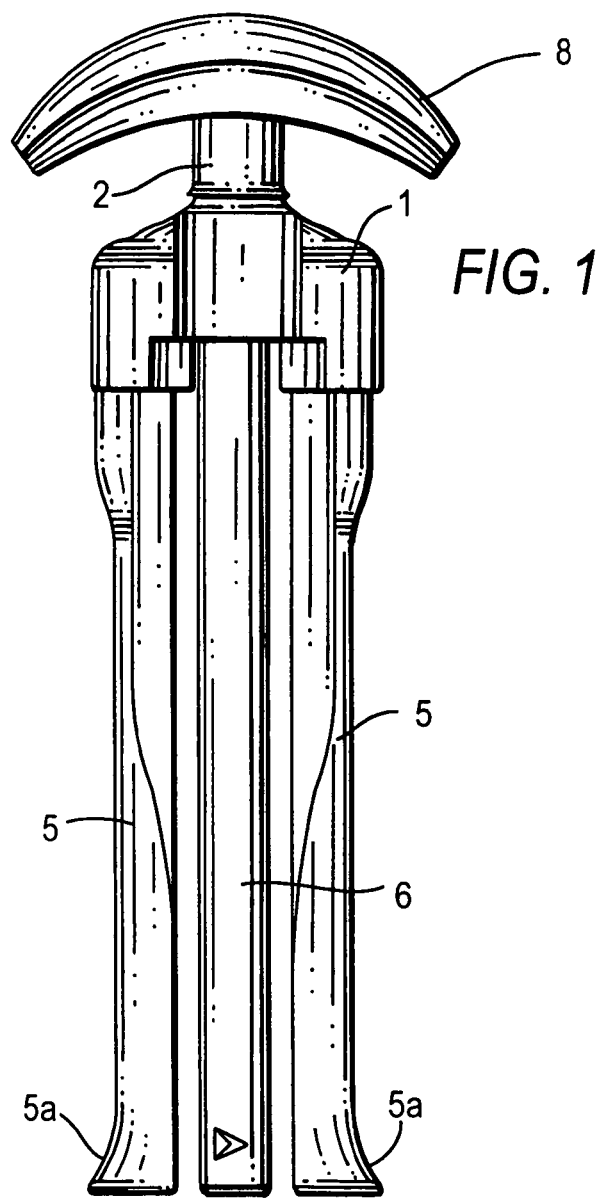
FIG. 1 is a front elevational view of the device.
Figure 1A:
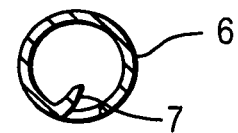
FIG. 1A is a cross-sectional view of a lower section of a tubular member of the device of FIG. 1.
Figure 4:
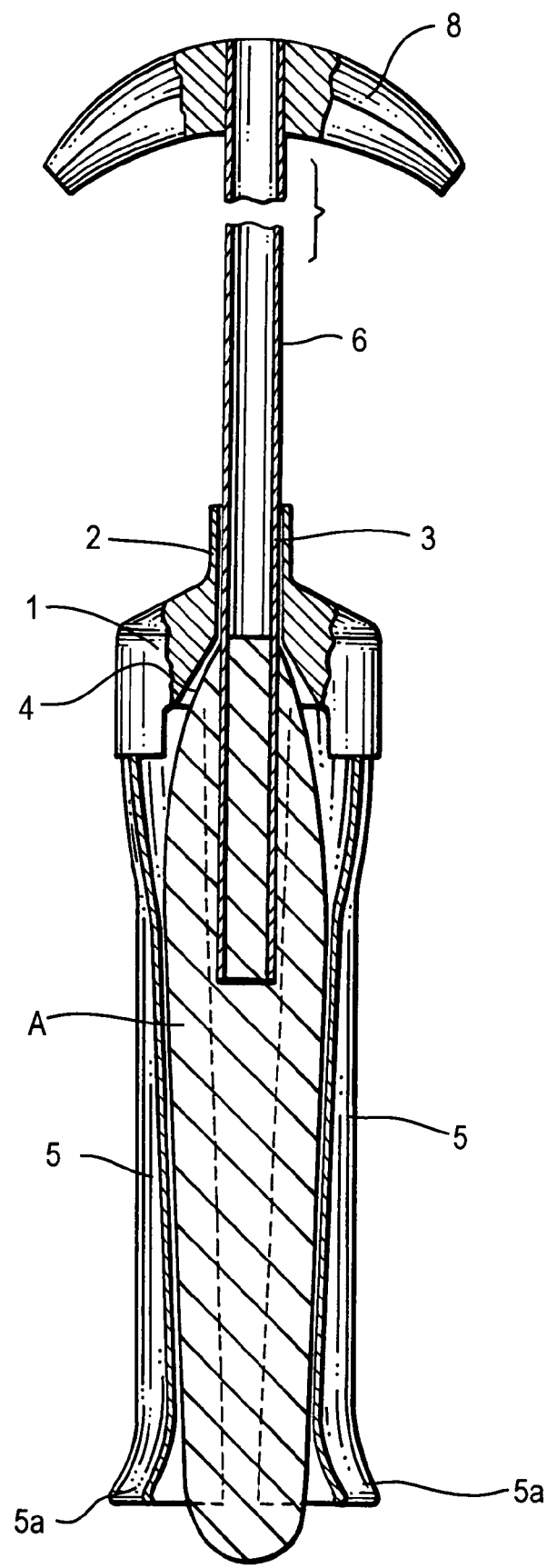

According to FIGS. 1-8, the present invention offers a device for the longitudinal drilling of a banana fruit A, shown to be in position in the device in FIG. 4 for the drilling operation. The device has a header 1 which may have an irregular cylindrical cross section, which has in its upper section an inclined annular surface that converges in a cylindrical section 2 with a vertical cylindrical perforation 3, passing through the abovementioned header 1 and joining to a cylindrical/conical cavity 4, annularly ribbed respective arms 5 of the arched cross section, projecting out from the lower base of the abovementioned header 1. The arms 5 have lower ends 5a which widen outwards, presenting the arms 5, in longitudinal edges, having arched sections 5b to facilitate through the pressure of the introduction and alignment of the banana, being placed in such perforation 3 and in a freely movable way, a tubular member 6 that has in its annular wall and adjacent to the lower end a carved horizontal V that defines interiorly a triangular tab or notch 7, as shown in FIG. 1A, and its upper end an arched part 8 of hexagonal cross section and vertically perforated with an upper opening, shown in FIGS. 4-8.

Figure 2:
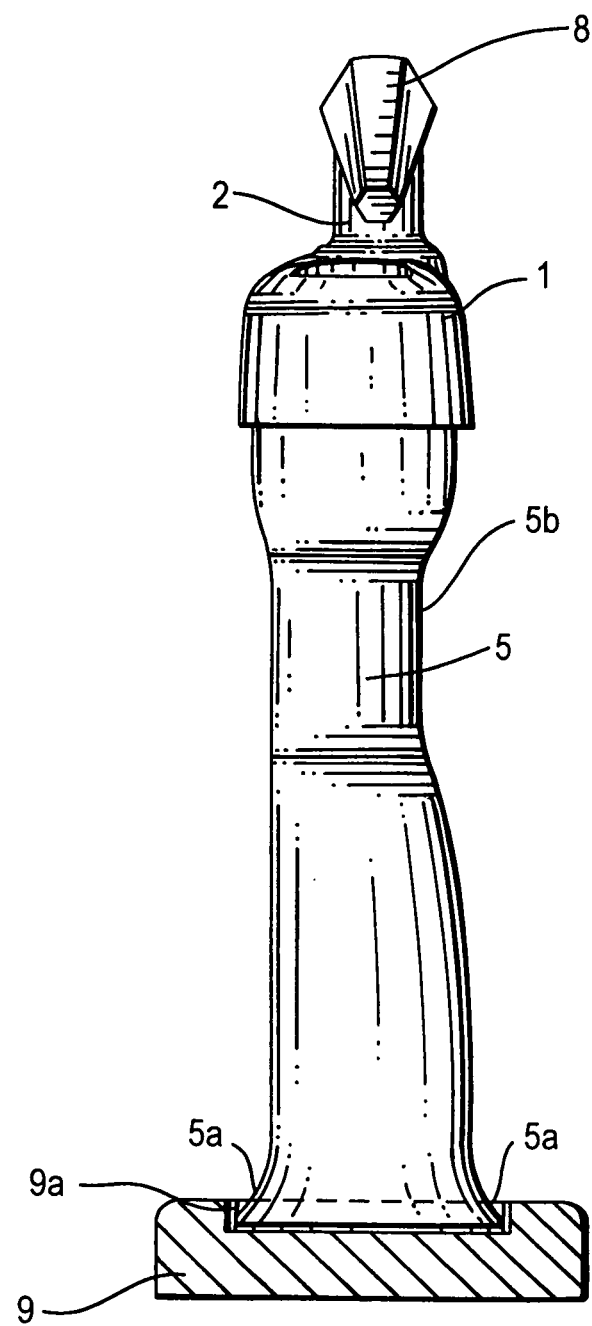
FIG. 2 is a side elevational view of the device positioned in a base for longitudinal support.
Figure 3:
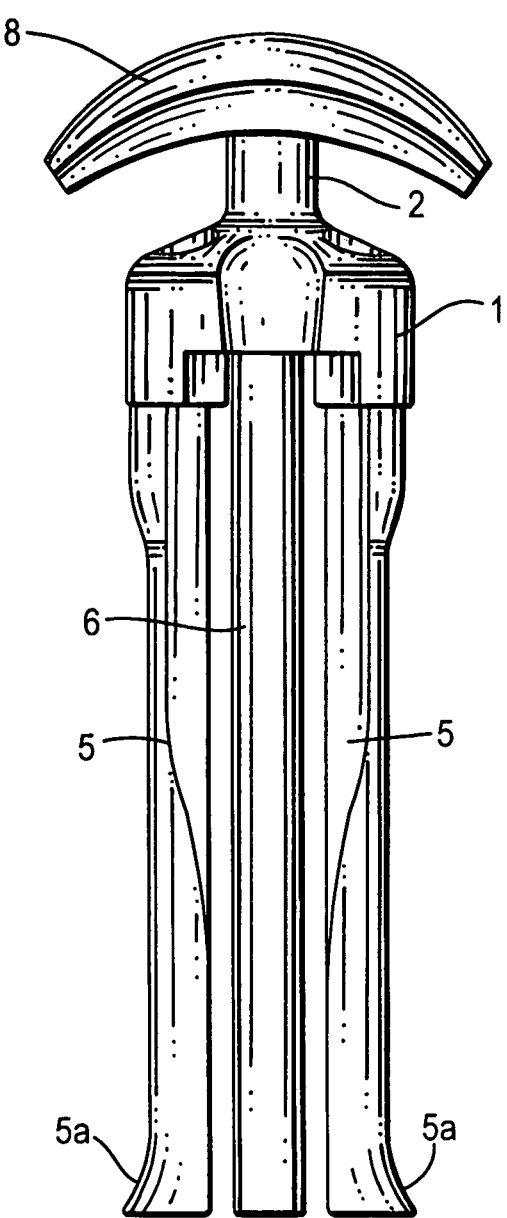
FIG. 3 is a rear elevational view of the device.
Figure 8:
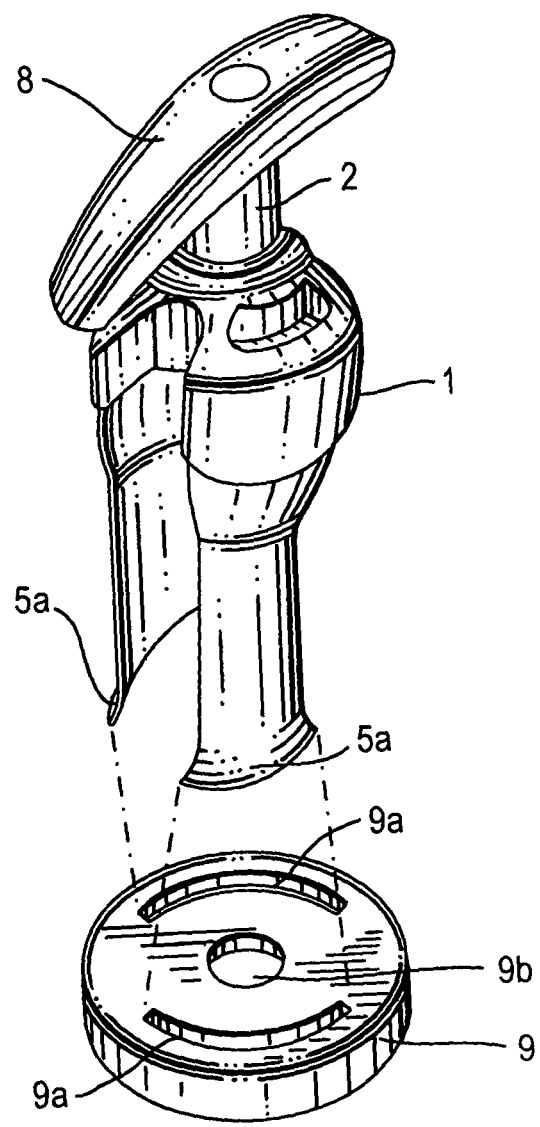
FIG. 8 is an top front right-side perspective view of such device.

The device is supplemented with a base part 9, shown in FIGS. 2 and 8, that in its internal surface presents according to the diametrical plane each arched groove 9a concentrically displayed in connection with a cylindrical cavity 9b that allows the insertion of the arched edges 5a and of the lower end of the tubular member 6 that has a spindle-shaped edge. The device is also supplemented by a rod 10, shown in FIG. 7, with an end cap 10a for the elimination of the product to be removed from the banana A.

Figure 5:
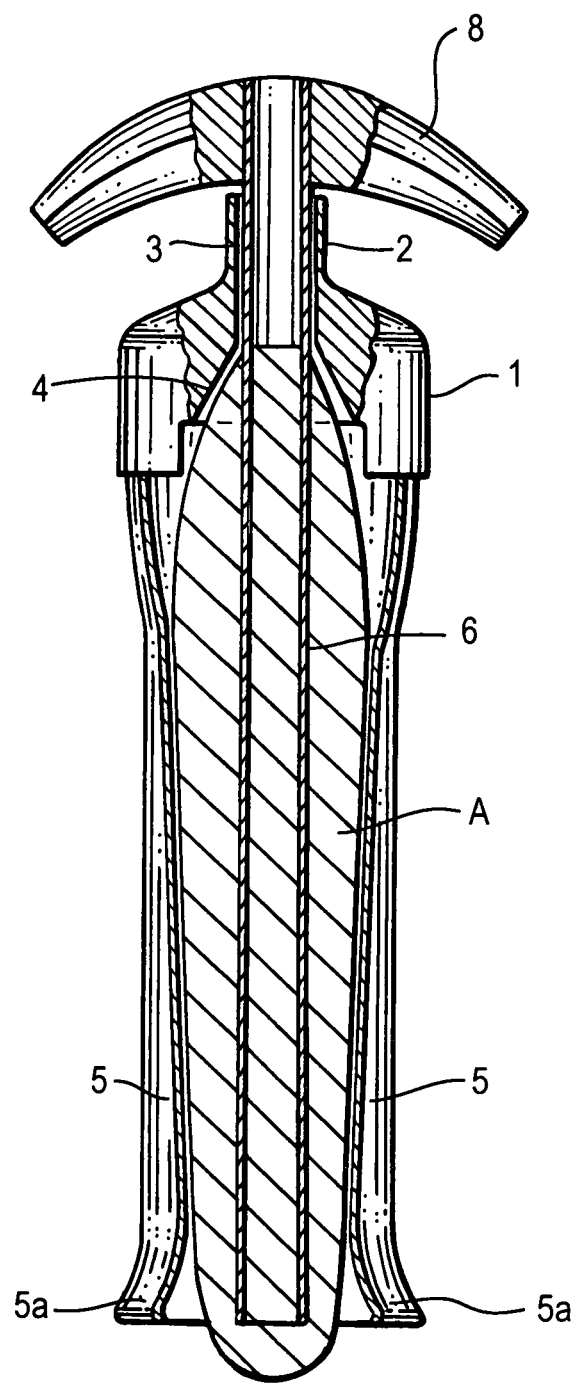

In FIGS. 4-6, the device of the present invention is illustrated in three operational stages, in which the banana A is positioned in the device, and the tubular member 6 is inserted into the banana A by inserting the tubular member 6 through the opening or perforation 3 in the header 1 and pushing down on the handle 8, as shown in FIG. 4, until the handle 8 is adjacent to the cylindrical section 2, as shown in FIG. 5, which forms a remainder A' of the banana A within the tubular member 6. By pulling upward on the handle 8, the tubular member 6 is removed along with the remainder A', as shown in FIG. 6. The rod 10 shown in FIG. 7 may then be inserted into an opening in the upper surface of the handle 8 to push out the remainder A' from the tubular member 6 for separate use, such as consumption, additional food processing, or disposal.

What is claimed is:

1. A device for forming an elongated, generally axially extending central cavity in a banana having a peel and an interior, said device comprising:
    a head having an upper portion and a lower portion, wherein said upper portion includes a first vertical passage therethrough having a first cross-sectional shape, and wherein said lower portion includes a vertically oriented conical passage extending from said first vertical passage and oriented to increase in diameter in a downward direction; wherein the banana includes opposite ends and the conical passage is sized and shaped to receive and secure one end of the banana while the banana is unpeeled;
    at least two arms having upper ends joined to and extending downwardly from said head; wherein said arms having curved interior surfaces facing one another, wherein the curved interior surface of each arm has a pair of opposed, vertically oriented edges which are spaced apart from the vertically oriented edges of an adjacent arm such that said arms surround a substantial majority of the banana peel, and wherein said curved interior surfaces are spaced from one another a distance for securely gripping the banana and maintaining the banana confined by the arms;
    an extractor comprising a hollow, elongated tubular extractor member and a handle, wherein said tubular extractor member has open opposite ends and an outer cross-sectional shape matching said first cross-sectional shape along its entire length, and wherein said tubular extractor member is sized for sliding through said first vertical passage to form the central cavity in the interior of the banana;
    wherein said handle has a curved central axis and the shape generally of a banana with opposed ends; wherein said handle has a hole extending through said curved central axis approximately midway between said opposed ends; wherein one of the ends of said tubular extractor member is secured in said hole of said handle so that the curve of the banana faces the tubular extractor member; and
    wherein the other of the ends of said tubular extractor member has a projection extending to the interior of the tubular extractor member to assist in extracting banana within the tubular extractor member after said tubular extractor member is inserted into the banana, thereby to form the central cavity.

2. The device of claim 1, wherein said interior surfaces have ribs to help secure the banana in place.

3. The device of claim 1, wherein each arm includes an outwardly flaring lower end, and further comprising a base having an upper surface with curved openings sized and shaped to receive said outwardly flaring lower ends for securely holding the head and arms while the tubular extractor member of said extractor is inserted into the banana interior.

4. The device of claim 1, wherein at least one of said arms includes an arched section (5*b*) to assist in receiving and aligning the banana within the device.

\* \* \* \* \*